US010733439B1

(12) United States Patent
Geng et al.

(10) Patent No.: US 10,733,439 B1
(45) Date of Patent: Aug. 4, 2020

(54) IMAGING RETINA IN HEAD-MOUNTED DISPLAYS

(71) Applicant: Facebook Technologies, LLC, Menlo Park, CA (US)

(72) Inventors: Ying Geng, Sammamish, WA (US); Yusufu Njoni Bamaxam Sulai, Bothell, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 15/788,766

(22) Filed: Oct. 19, 2017

Related U.S. Application Data

(60) Provisional application No. 62/410,771, filed on Oct. 20, 2016.

(51) Int. Cl.
*G06K 9/00* (2006.01)
*G06F 3/01* (2006.01)

(52) U.S. Cl.
CPC ........... *G06K 9/0061* (2013.01); *G06F 3/013* (2013.01); *G06K 9/00604* (2013.01)

(58) Field of Classification Search
CPC ... G06K 9/0061; G06K 9/00604; G06F 3/013
See application file for complete search history.

(56) References Cited

U.S. PATENT DOCUMENTS 9,788,714 B2 * 10/2017 Krueger ................ A61B 5/163
2010/0201944 A1 * 8/2010 Lewis .................... A61B 3/103
351/206

2012/0069299 A1 * 3/2012 Abramoff ............. A61B 3/1225
351/206
2014/0361957 A1 * 12/2014 Hua ........................ G06F 3/013
345/8
2014/0375541 A1 * 12/2014 Nister ..................... G06F 3/013
345/156

(Continued)

FOREIGN PATENT DOCUMENTS

WO   WO-2013162895 A1 * 10/2013 ........... H04N 13/363
WO   WO-2016022215 A1 *  2/2016 ............... A61B 3/12

(Continued)

OTHER PUBLICATIONS https://eyecancer.com/eye-cancer/conditions/choroidal-tumors/choroidal-nevus/. The earliest posting occurred on Oct. 19, 2016 acording top the internet archive Wayback Machine. (Year: 2016).*

(Continued)

*Primary Examiner* — Richard A Hansell, Jr.
(74) *Attorney, Agent, or Firm* — Fenwick & West LLP

(57) ABSTRACT

A head-mounted display (HMD) presents content for viewing by users. The HMD includes a display element for displaying content to a user wearing the HMD and a detector (e.g., camera) for capturing one or more images of a retina of an eye of the user, where the one or more images are captured while the retina is reflecting light originating from one or more tracking light sources positioned at predetermined locations. The HMD also includes a controller for identifying one or more features of the retina based on the captured one or more images of the retina and for determining one or more optical metrics based in part on the identified one or more features of the retina.

14 Claims, 7 Drawing Sheets

(56) References Cited

U.S. PATENT DOCUMENTS

| | | | |
|---|---|---|---|
| 2016/0081547 A1* | 3/2016 | Gramatikov | G06K 9/00604 |
| | | | 351/210 |
| 2016/0180591 A1* | 6/2016 | Shiu | G02B 27/0172 |
| | | | 345/633 |
| 2016/0262608 A1* | 9/2016 | Krueger | G16H 50/30 |
| 2017/0261750 A1* | 9/2017 | Wong | G02B 27/017 |

FOREIGN PATENT DOCUMENTS

| | | | | |
|---|---|---|---|---|
| WO | WO-2016046514 A1 * | 3/2016 | | G02B 27/0172 |
| WO | WO-2017053382 A1 * | 3/2017 | | A61B 3/14 |

OTHER PUBLICATIONS

Kuwabara T. and D.G. Cogan, "Retinal vascular patterns VII. Acellular change", Investigative Opthalmology, Dec. 1965 Downloaded From: https://iovs.arvojournals.org/pdfaccess.ashx?url=/data/journals/iovs/932955/ (Year: 1965).*

Richter et al. "OLED-on-CMOS based bidirectional microdisplay for near-to-eye and sensor applications", 2011 Semiconductor Conference, Dresden, DOI: 10.1109/SCD.2011.6068730 Sep. 27-28, 2011, IEEE (Year: 2011).*

Colarusso P. and K.R. Spring "Imaging at Low Light Levels with Cooled and Intensified Charge-Coupled Device Cameras" Methods in Enzymology, vol. 30, 2003 (Year: 2003).*

Kuwabara T. and D.G. Cogan, "Retinal vascular patterns VII. Acellular change", Investigative Opthalmology, Dec. 1965 Downloaded From: https://iovs.arvojournals.org/pdfaccess.ashx?url=/data/journals/iovs/932955/ (Year: 1965).*

Cordero, I., "Understanding and Caring for an Indirect Ophthalmoscope," Community Eye Health Journal, 2016, p. 57, vol. 29, No. 95, May be Retrieved at<URL:https://www.cehjournal.org/article/understanding-and-caring-for-an-indirect-ophthalmoscope/>.

Colenbrander, A., Chapter 63: Principles of Ophthalmoscopy, in Clinical Ophthalmology, T.D. Duane, ed., 1979, 37 pages, vol. 1, May be Retrieved at<URL:https://www.scribd.com/document/343826871/Chapter-63>.

* cited by examiner

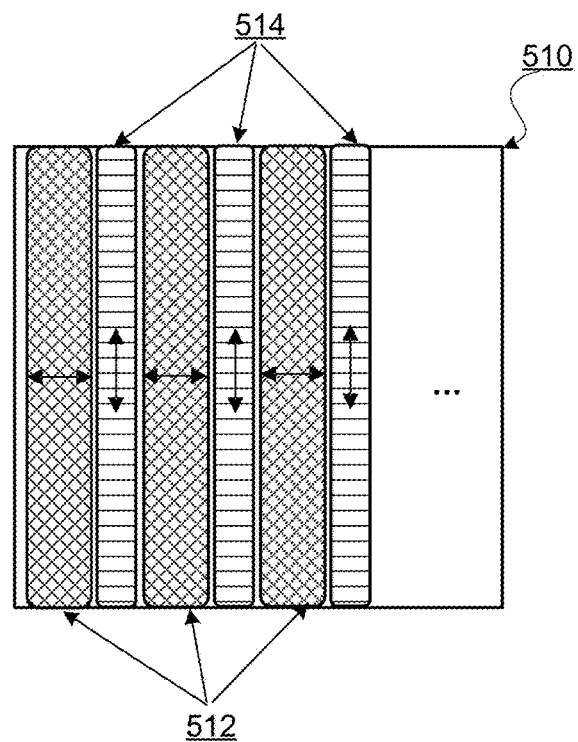
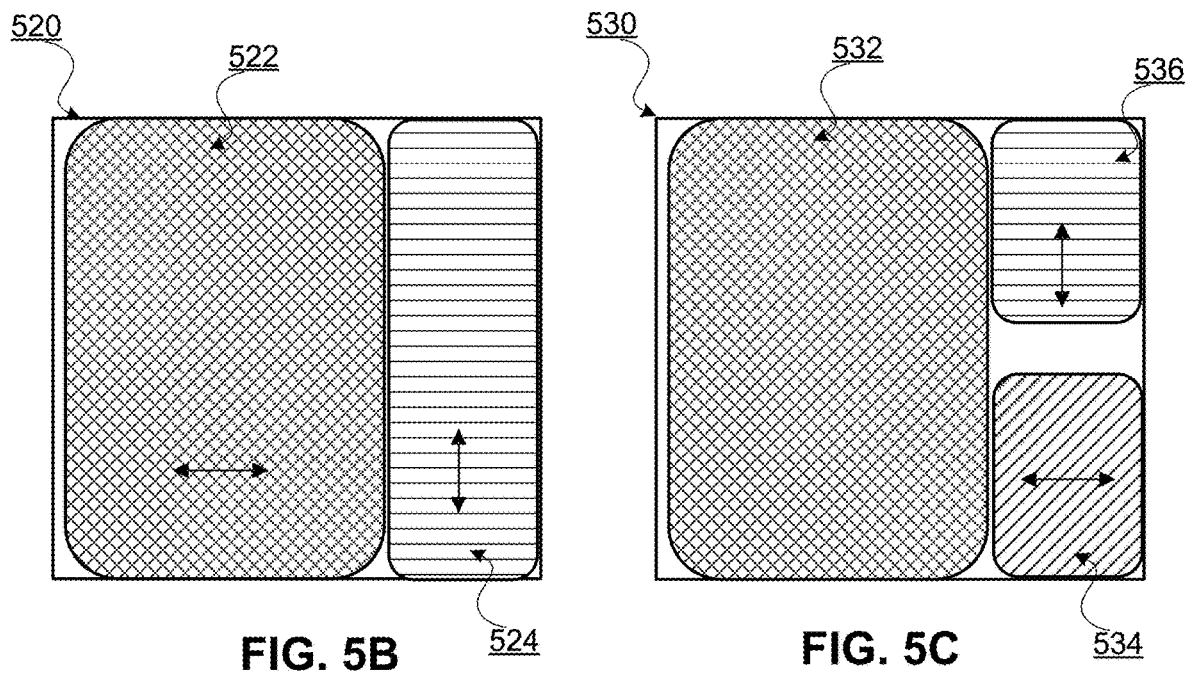
FIG. 5A
FIG. 5B
FIG. 5C

US 10,733,439 B1

IMAGING RETINA IN HEAD-MOUNTED DISPLAYS

CROSS REFERENCE TO RELATED APPLICATIONS

This application claims the benefit of U.S. Provisional Application No. 62/410,771 filed Oct. 20, 2016, which is incorporated by reference in its entirety.

BACKGROUND

The present disclosure generally relates to eye tracking, and specifically to retinal imaging based eye tracking in head-mounted displays (HMDs).

Eye tracking is an important feature for the HMD systems including systems used in virtual reality (VR) applications. Conventional tracking systems track features of the human eye and are typically limited by the quality of the optical path. These conventional systems do not provide sufficient accuracy needed for eye tracking in a HMD system. For example, the accuracy of conventional tracking systems that are based on pupil tracking and glint tracking is lower due to that it's an indirect measurement of gaze direction and there are many calibration and computation steps that could induce errors.

SUMMARY

A retinal eye tracking system for use in, e.g., a head-mounted display (HMD). The retinal eye tracking system may be a part of a HMD and can be used in a VR system environment or other system environments, such as an augmented reality (AR) system and/or a mixed reality (MR) system. The retinal eye tracking makes use of the observation that light that is incident on a retinal surface is reflected from the retinal surface and retraces the same path back to its origin (.e.g., like a retroreflector). The tracking system captures images of the retina while the user is viewing a specific tracking pixel that is emitting tracking light and analyzes the captured images to identify certain features of the eye such as a fovea, the optic disk, or blood vessels to determine optical metrics such as the user's gaze. Backreflections from the optics block may be minimized by placing the tracking light sources between the optics block and the exit pupil. Backreflections from the corneal surface may be reduced by using orthogonal polarization between the tracking light and the light captured by the detectors, or by separating the beam path between illumination and imaging.

The HMD includes a display element for displaying content to a user wearing the HMD and a detector (e.g., camera) for capturing one or more images of a retina of an eye of the user, where the one or more images are captured while the retina is reflecting light originating from one or more tracking light sources positioned at known locations. The HMD also includes a controller for identifying one or more features of the retina based on the captured one or more images of the retina, and for determining one or more optical metrics based in part on the identified one or more features of the retina. For example, the optical metrics may include at least one of: gaze direction, vergence angle, accommodation depth, identification of the user, and torsional state. The optical metrics may be determined based on identifying a location of the identified one or more features of the retina. Example features include fovea, blood vessels, capillaries, optic disk, nerve fiber bundles, and certain structures caused by pathology unique to the user.

BRIEF DESCRIPTION OF THE DRAWINGS

FIGS. 5A-5C depict example polarization techniques for reducing backreflections in HMD systems, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1A:
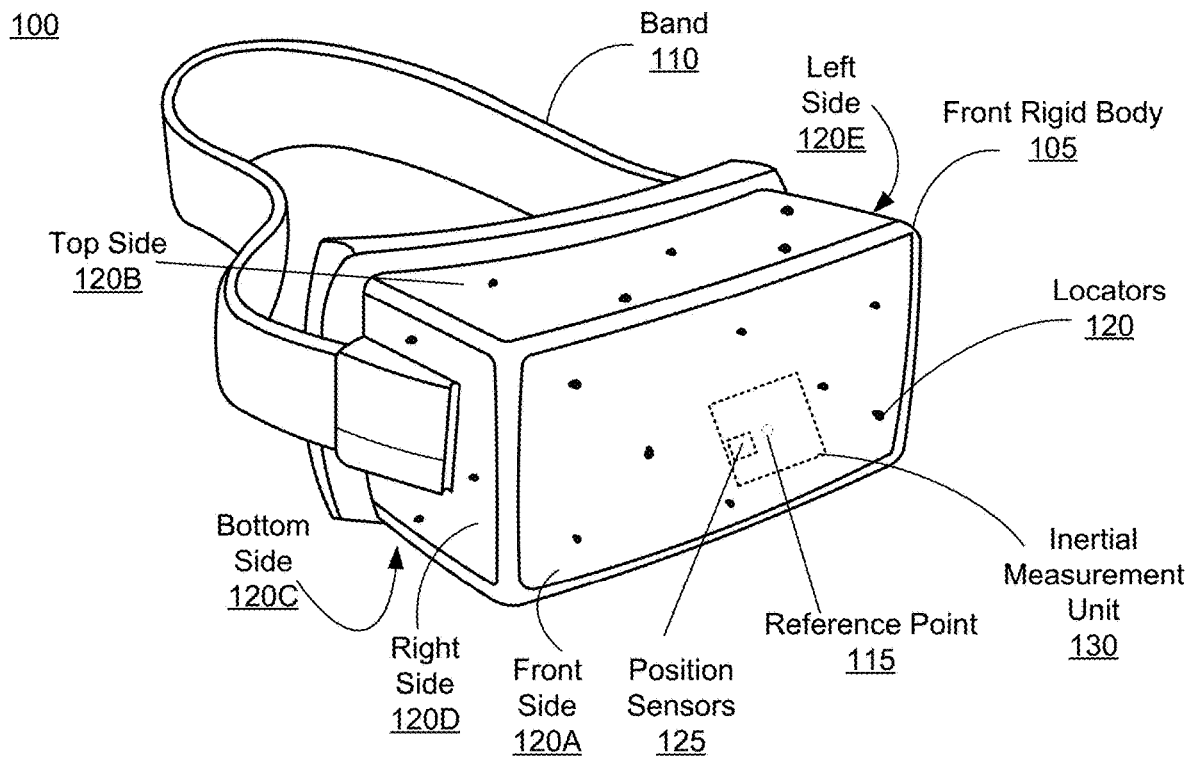
FIG. 1A is a wire diagram of a HMD, in accordance with an embodiment.

FIG. 1A is a wire diagram of a HMD 100, in accordance with an embodiment. The HMD 100 is an embodiment of the HMD 705 as described below in conjunction with FIG. 7, and includes a front rigid body 105 and a band 110. The front rigid body 105 includes an electronic display (not shown in FIG. 1A; e.g., electronic display 715), an inertial measurement unit (IMU) (e.g., IMU 730), one or more position sensors 125, and locators 120. In the embodiment shown by FIG. 1A, the position sensors 125 are located within the IMU, and neither the IMU nor the position sensors 125 are visible to the user.

The locators 120 are located in fixed positions on the front rigid body 105 relative to one another and relative to a reference point 115. In the example of FIG. 1A, the reference point 115 is located at the center of the IMU. Each of the locators 120 emit light that is detectable by an imaging device (e.g., imaging device 735) of the system. Locators 120, or portions of locators 120, are located on a front side 120A, a top side 120B, a bottom side 120C, a right side 120D, and a left side 120E of the front rigid body 105 in the example of FIG. 1A.

Figure 1B:
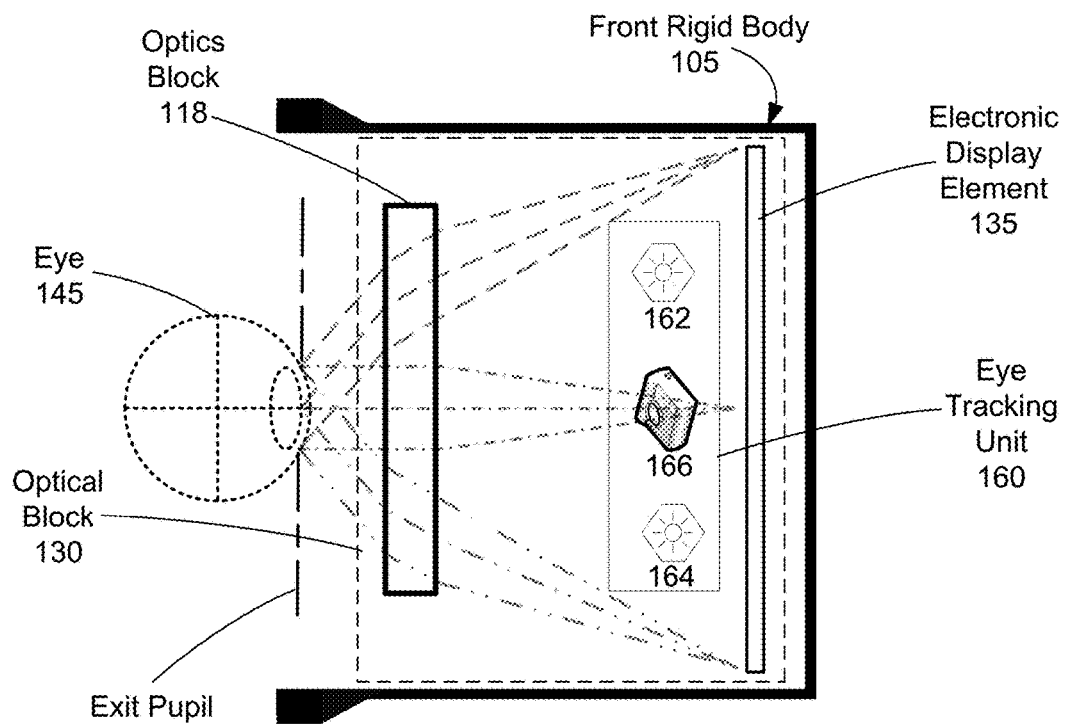
FIG. 1B is a cross section of the front rigid body of the embodiment of the HMD shown in FIG. 1A.

FIG. 1B is a cross section 175 of the front rigid body 105 of the embodiment of the HMD 100 shown in FIG. 1A. As shown in FIG. 1B, the front rigid body 105 includes an optical block 130 that provides altered image light to an exit pupil 150. The exit pupil 150 is the location of the front rigid body 105 where a user's eye 145 is positioned, also referred to as "eye box." For purposes of illustration, FIG. 1B shows a cross section 175 associated with a single eye 145, but another optical block, separate from the optical block 130, provides altered image light to another eye of the user.

The optical block 130 includes an electronic display element 135 of an electronic display (e.g., electronic display 715), an optics block 118 (e.g., same as optics block 718 described below with reference to FIG. 7), and an eye tracking unit 160. The electronic display element 135 emits image light toward the optics block 118. The optics block 118 magnifies the image light, and in some embodiments, also corrects for one or more additional optical errors (e.g., distortion, astigmatism, etc.). The optics block 118 directs the image light to the exit pupil 150 for presentation to the user.

Figure 7:
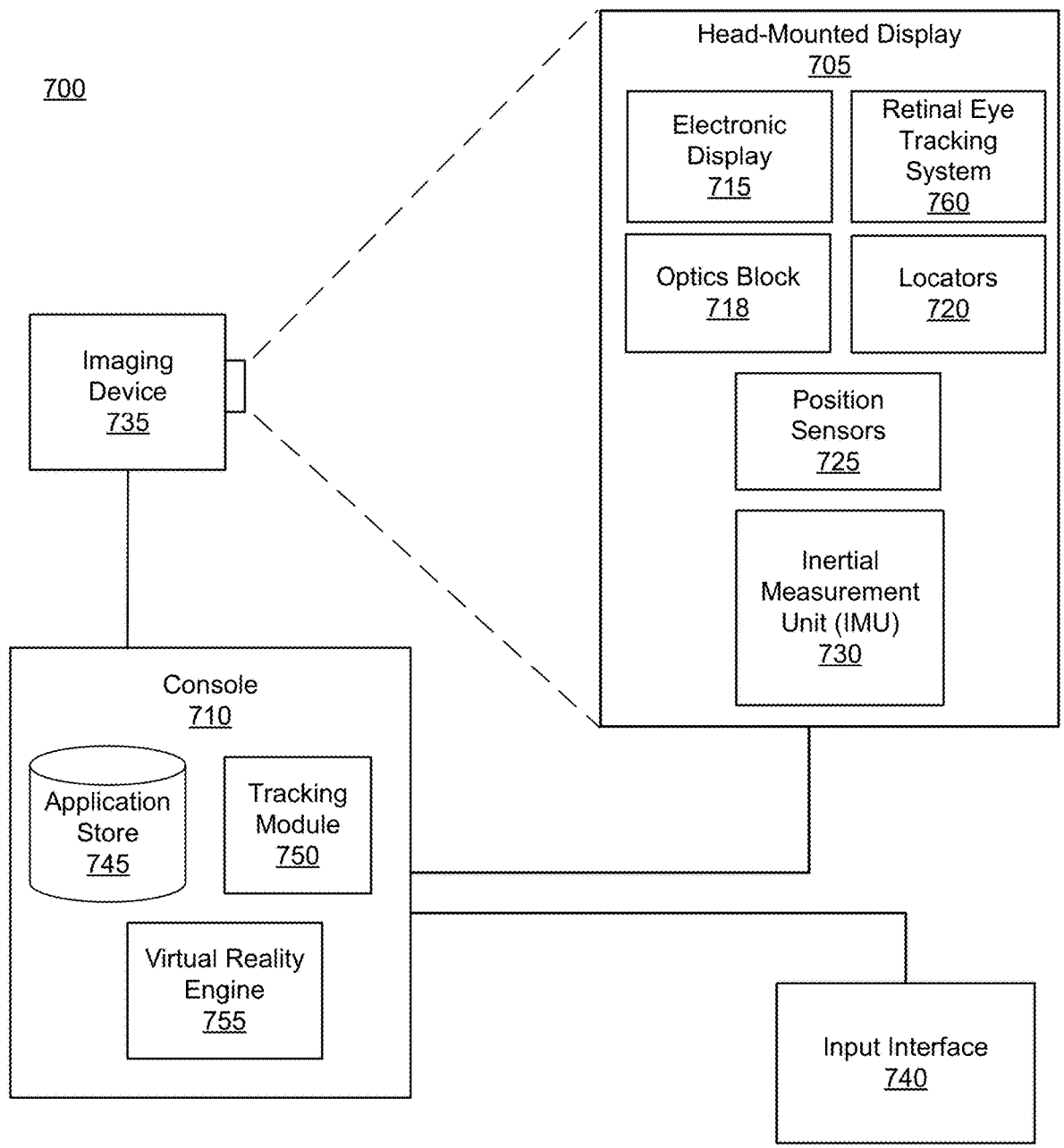
FIG. 7 is a diagram of a system environment including a HMD system, in accordance with an embodiment.

The HMD 100 includes an eye tracking unit 160 (e.g., the eye tracking unit of the retinal eye tracking system 760 of FIG. 7). The eye tracking unit 160 includes illumination sources and optical sensors. In one embodiment, the eye tracking unit 160, as shown in FIG. 1B, includes a plurality of illumination sources (e.g., illumination sources 162 and 164), and a plurality of optical sensors (e.g., two optical sensors such as optical sensor 166) for each eye. The illumination sources and the optical sensors of the eye tracking unit 160 are coupled to a control module (not shown in FIG. 1B) that performs the necessary data processing for imaging retina of a user and determining optical metrics such as determining the user's gaze direction. The control module is located within the HMD 705 and/or the console 710 described below in conjunction with FIG. 7. Also, in some embodiments, there is at least one eye tracking unit 160 for the left eye of the user and at least one eye tracking unit 160 for the right eye of the user.

The illumination sources 162 and 164 and optical sensor 166 are used for eye tracking of a user's eye using imaging retina. The illumination sources 162 and 164 emit light such that when the emitted light reflects off of the user's retina while the user views the emitted light, the optical sensor 166 captures one or more images of the user's retina (i.e., retinal images). The eye tracking unit 160 is positioned within the optical block 130 such that light emitted from the illumination sources 162 and 164 reaches the user's eye through the optics block 118. In some embodiments, the plurality of illumination sources comprise different characteristics for either all of the illumination sources or between the illumination sources. For example, light originating from the plurality of illumination sources can include one or more of: different wavelengths, modulated at different frequencies or amplitudes (i.e., varying intensity), have different temporal coherence that describes the correlation between the two light waves at different points in time, and multiplexed in either time or frequency domain.

In one embodiment, the entire eye tracking unit 160 (i.e., illumination sources and detectors) is positioned within the optical block 130 such that the optical sensor 166 (e.g., camera) can capture images of the user's retina over a range of eye motion. Alternatively, the illumination sources of the eye tracking unit 160 are positioned outside the optical block 130 (e.g., in between the user's eye 145 and optics block 118 to reduce the backreflection of light due to the optics block 118, which is further described below in conjunction with FIGS. 3A-3C. An example retinal eye tracking system is described further below with reference to FIG. 2.

Retinal Eye Tracking System

Figure 2:
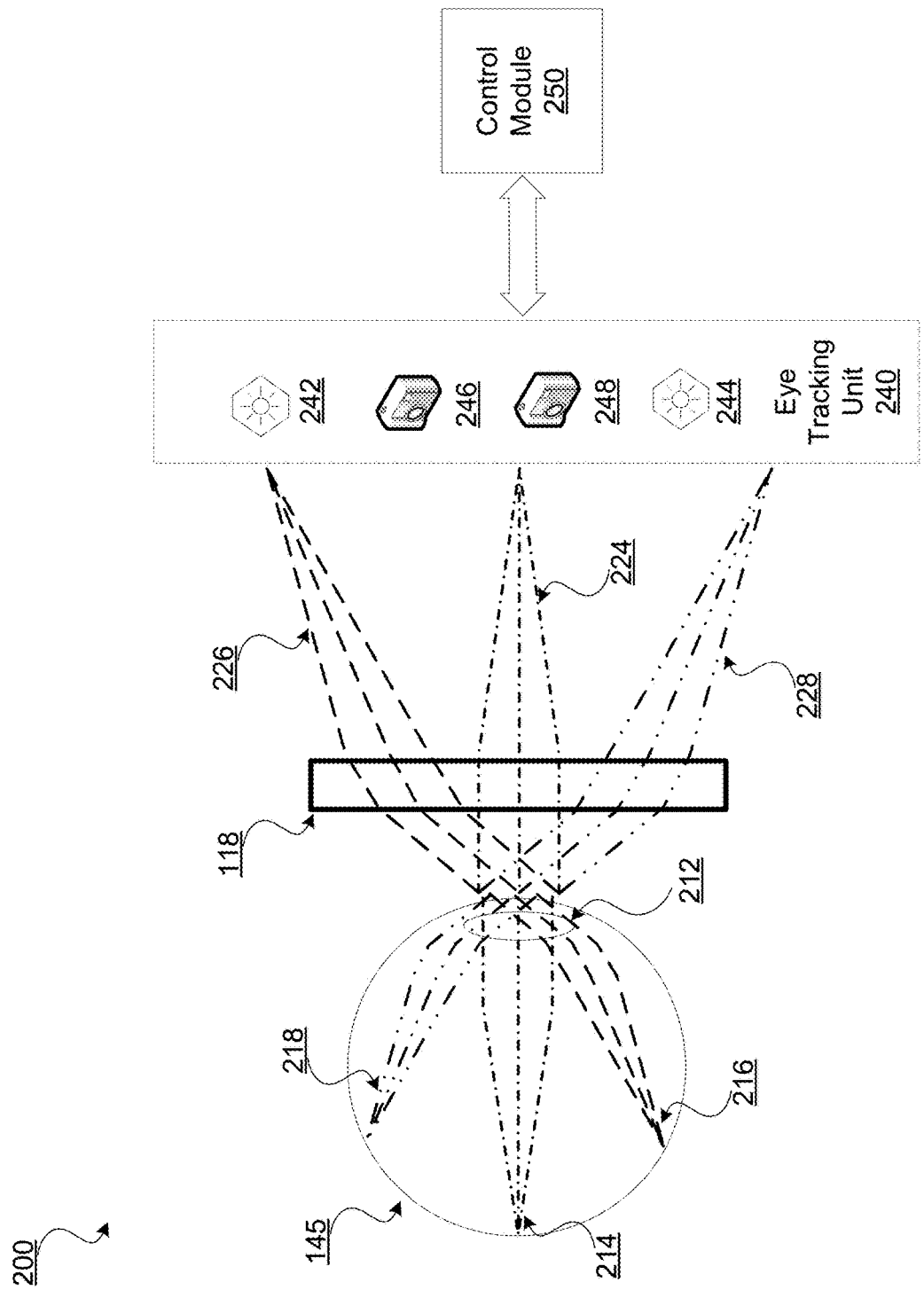
FIG. 2 depicts an example retinal eye tracking system in HMD systems, in accordance with an embodiment.

FIG. 2 depicts an example retinal eye tracking system 200, in accordance with an embodiment. The retinal eye tracking system 200 includes, among other components, an eye tracking unit 240, a control module 250 and the optics block 118 to track an eye 145 of a user. For simplification, the discussion of the retinal eye tracking system 200 is with regard to a single eye of the user. However, in some embodiments, corresponding eye tracking unit 240 may be employed for each of the user's eyes. In such embodiments, a single control module 250 may control the multiple eye tracking units 240.

The eye tracking unit 240 includes, among other components, a plurality of illumination sources (e.g., illumination sources 242 and 244) and a plurality of optical sensors (e.g., optical sensors 246 and 248). The illumination sources (e.g., point light sources) and optical sensors (e.g., camera) of the eye tracking unit 240 are used for retinal eye tracking and to determine optical actions such as determining the user's gaze direction while the user is viewing content using the HMD 705. The illumination sources 242 and 244 have well-known emission characteristics such as ideal point light sources. For example, illumination sources can be tracking pixels that are separate from content pixels that present normal content for display to the user. The term illumination sources is interchangeably used with tracking pixels throughout the disclosure. In one embodiment, two illumination sources are used. Alternatively, more than two illumination sources, such as, a ring of illumination sources are used. The ring of illumination sources are a plurality of sources that may be positioned relative to each other such that together they generally have a circular shape. For example, the ring of illumination sources can be positioned either in the same two-dimensional plane or in arbitrary positions relative to a reference point (e.g., location of an entrance pupil of the HMD, an exit pupil of the HMD, or reference point 115). In one embodiment, the illumination sources can be located outside of the user's line of sight. Illumination sources positioned arbitrarily from the reference point can be placed at different depths from the reference point and/or at non-uniform spacing between the sources to improve the accuracy of the eye tracking.

The optical sensors 246 and 248 capture images of the user's retina while the user's eye is viewing light originating from the illumination sources 242 and 244. For example, the optical sensors 246 and 248 are cameras or photodetectors that can capture still pictures or video. The term optical sensor is interchangeably used with detector or photodetector throughout the disclosure. The optical sensors 246 and 248 have a plurality of parameters such as focal length, focus, frame rate, ISO, sensor temperature, shutter speed, aperture, resolution, etc. In some embodiments, optical sensors 246 and 248 are detector pixels that are embedded next to the display pixels. In some embodiments, the optical sensors 246 and 248 have a high frame rate (e.g., 90 Hz or higher) and high resolution (e.g., 1080 p or higher). The optical sensors 246 and 248 can capture either two-dimensional images or three-dimensional images. The optical sensors 246 and 248 may be placed such that the retinal images in response to the light from the illumination sources incident upon the eye can be captured over a range of eye movements (e.g., a maximum possible range). For example, when a ring of illumination sources are placed around the eye, the optical sensors 246 and 248 are placed pointed towards the eye around the center of the ring such that light emitted from the sources is directed towards the eye (e.g., in the line of sight of the user). Alternatively, the optical sensors 246 and 248 are placed off-axis such that it is outside of the line of sight of the user. In one embodiment, more than two optical sensors 246 and 248 are used per eye to capture retinal images of the eye while light from illumination sources is incident upon the eye. For example, the number of optical sensors used per eye is same as the number of illumination sources used per eye.

The illumination sources 242 and 244 emit light that reaches the retina of the user's eye 145 by passing through the optics block 118, the corneal surface (not labeled in FIG. 2) of the eye 145, and the lens 212 of the eye 145. The light that reaches the retina is reflected from the retinal surface and retraces the same path back to the location of the illumination sources 242 and 244. The light path is reversible in the sense that, for an HMD to work, the light originating from the display pixels is imaged to the viewer's retina such that an image can be seen; while on the other hand, if the display pixels are replaced by detector pixels or is interlaced with detector pixels, the viewer's retina can be directly imaged in the display pixel plane that also has detector pixels. Because of this reversibility, if the viewer can see an image of the HMD panel clearly, he also has the potential of having his retina imaged onto the HMD panel clearly. This is true even if the user has a large refractive error and needs prescription correction, because the same prescription correction can sharpen both the HMD image and the retinal image, given that light path is reversible. Light originating from the illumination sources may focus on the viewer's pupil plane, reach the retinal surface, and reflects off of the retinal surface to reach back at the illumination sources. The light reflected at the retinal surface is then captured (e.g., as an image) by at least one of the optical sensors 246 and 248. For example, light rays represented by lines 224, 226, and 228 originating at the illumination sources 242 and 244 are incident upon the eye 145 via the optics block 118. The light incident on the eye 145 passes through the cornea and the eye lens 212 before reaching the retinal surface. The light rays reaching the retinal surface are represented by lines 214, 216, and 218, which correspond to the light rays represented by lines 224, 226, and 228 respectively. Light rays incident upon the retinal surface reflect at the retinal surface and trace back the same path as the incident light rays and reach the location of the illumination sources 242 and 244, where the light rays originated. Optical sensors 246 and 248 are placed very close to the location of the illumination sources such that the eye 145 viewing content presented by a specific illumination source is captured by a detector that is positioned very close (e.g., overlapping) to the location of the specific illumination source.

The control module 250 processes the captured one or more retinal images while the retina reflects light to determine one or more optical actions being performed by the eye 145. In some embodiments, a single control module 250 may control the multiple eye tracking units 240 such as one eye tracking unit 240 for the left eye and another eye tracking unit 240 for the right eye. The control module 250 may help track a user's eye movements by determining the user's gaze direction by detecting one or more features of the eye (e.g., fovea) within the captured images.

An example method for retinal eye tracking includes an identification of one or more eye features such as the fovea in the retinal images. In this method, a set of tracking pixels (e.g., plurality of tracking pixels) is turned on to display light used for tracking the user's eye movements. A set of detectors is used to capture retinal images while the retina reflects the light originating from the tracking pixels. The set of detectors is positioned such that one or more detectors that correspond to each tracking pixel set of tracking pixels are positioned very close to the tracking pixel. For example, the one or more detectors are placed in an area between the tracking pixel and its adjacent content pixel, the area also referred to as "black matrix." Alternatively, the detectors are overlaid over the tracking pixels (and/or over the content pixels) in a different Z-plane (i.e., at a different distance from the eye 145 or the reference point 115). In this alternate embodiment, the tracking pixels emit light that is either in a band other than the visible band as the content pixels emit light in the visible band or in the visible band but at a time other than when content pixels display light.

In this example method, the user's eye is looking at a specific tracking pixel among the set of tracking pixels emitting tracking light. Images of the user's retina are captured using the set of detectors while the eye is viewing the tracking light from the specific tracking pixel. The specific tracking pixel may be within the user's field of view and not necessarily in the light of sight of the user. For example, the specific tracking pixel may be in a peripheral vision of the user. The captured retinal images are analyzed by the control module 250 to determine the specific tracking pixel the eye is looking at while the retinal images are captured. The tracking pixel is determined, for example, by identifying a location of one or more features of the eye (e.g., fovea, optics disk, blood vessels) within the captured images. When visible light is incident on human retina, the main features that can be captured by the detectors include fovea, blood vessels, capillaries, the optic disk, and certain structures caused by pathology. When infrared light is incident, nerve fiber bundle features may be captured in addition to the features captured using visible light.

An example method to determine the tracking pixel the user is looking at includes identifying a location of the features of the retina (e.g. fovea, optic disk, blood vessels) relative to a reference point (e.g., center of the captured image) on the captured image.

Another example method to determine the tracking pixel the user is looking at includes comparing the captured set of retinal images with a set of baseline retinal images, where the baseline set of images is captured during an initial retinal calibration process. During an initial retinal calibration process, the user is asked to look at particular directions where different tracking pixels that are placed at known locations and to record retinal images using the set of detectors also placed at known locations. The tracking pixels positioned at the particular directions the user looks at may include either visible or IR pixels. In the case of IR pixels, the user is looking at a visible pixel that is adjacent to the IR tracking pixel. In one embodiment, the retinal calibration process is a one-time process for a given user. If more than one user uses the HMD, each such user has to undergo the retinal calibration process before they begin using the HMD. The tracking pixel the user is looking at while viewing content in the HMD may be determined by comparing the set of retinal images captured while the user is viewing the content with that of the baseline set of images specific to the user by using algorithms such as cross correlation algorithms.

The content displayed by the content pixels on the electronic display element 135 uses visible light. In one embodiment, the visible light displayed on the electronic display element 135 is strong enough to be also used as tracking light emitted by the tracking pixels. For example, a typical factor of reflectance of human retina is in the order of $10^{-3}$, which sets a threshold intensity for the visible light displayed on the electronic display element 135. If the display light intensity is not strong enough to be used for retinal eye tracking, an infrared light (e.g., wavelength ranging from about 750 nm to 1 mm) may be used for retinal eye tracking. The wavelength of the IR light can be optimized by taking into consideration the eye's maximum permissible exposure limit, minimization of the visibility of the light, and sensitivity and cost of the detectors. In one embodiment, the IR tracking light is always on. Alternatively, the IR tracking light is turned on when the visible display light (used for displaying content viewed by the user) is not on. This is possible as the electronic display element 135 needs low persistence such that the visible display light is on for about 10-20% of a frame time. In some embodiments, a combination of visible and IR light is used for the tracking light.

When light is incident upon the human eye, the eye produces multiple reflections including a backreflection from the outer surface of the cornea, and another backreflection from the optics block 118. It is important to reject the backreflections from both the cornea and the optics block 118 as these backreflections may be much stronger than the wanted reflections of the retinal surface that is to be captured by the detectors. For example, the corneal surface typically reflects about 4% of its incident light whereas the intensity of the light that reaches the detectors after reflecting off of the retinal surface is much lower and is based on a retinal reflectance factor in the order of $10^{-3}$. An example technique for reducing backreflections is described below with reference to FIGS. 3A-3C.

Figure 3A:
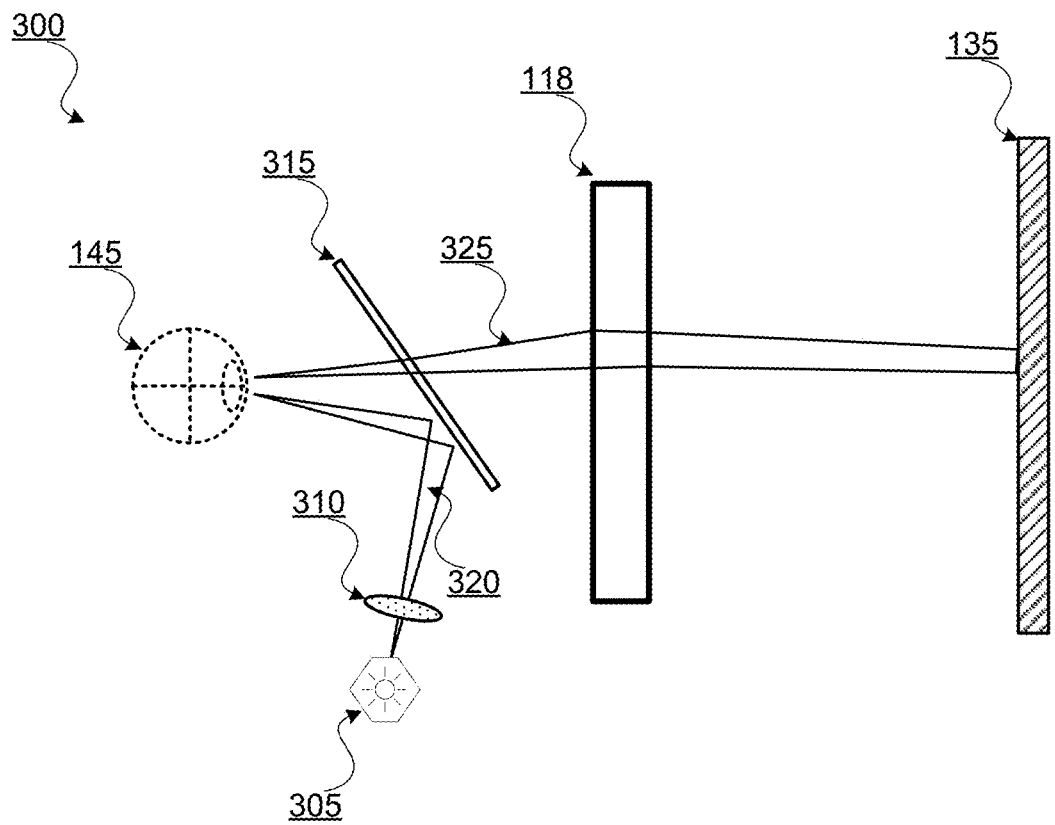
FIG. 3A depicts an example retinal eye tracking system for reducing backreflections in HMD systems, in accordance with an embodiment.

FIG. 3A depicts an example retinal eye tracking system 300 for reducing backreflection in HMD systems, in accordance with an embodiment. The example retinal eye tracking system 300 eliminates the backreflections due to the optics block 118 by placing the tracking light source 305 such that the tracking light is not incident on the optics block 118 before reaching the eye 145. The example retinal eye tracking system 300 further reduces the backreflections due to the cornea by using an annular reflective coating on a beam splitter placed between the eye 145 and the optics block 118 as discussed below.

The example retinal eye tracking system 300 includes the electronic display element 135, the optics block 118, one or more tracking light sources 305, a coating element 310, and a beam splitter 315. The tracking light source 305 is placed in between the eye 145 of the user and the optics block 118 such that the tracking light may be incident on the eye 145 without having to be incident on the optics block 118. For example, the tracking light from the source 305 is incident on a beam splitter 315 that is placed such that the tracking light 320 reflects onto the eye 145. The beam splitter 315 is an optical device that splits a beam of light into two beams including a transmitted beam and a reflected beam. In some embodiments, a reflector may be used instead of the beam splitter, where the reflector has a similar reflection profile as that of the beam splitter. For example, the reflector reflects light incident on a portion of the reflector and transmits light incident on a different portion of the reflector. In some embodiments, the beam splitter 315 may include a coating to absorb the light that is incident on the coated portion, where the absorbed light might be either the transmitted beam or the reflected beam. A portion of the tracking light 320 that reaches the eye 145 is reflected at the cornea and another portion reaches the retina and is also reflected at the retinal surface. The portion of the light reflected by the cornea (i.e., corneal backreflection) reaches the source 305 and the other portion that reflects off of the retina passes through the beam splitter 315 and reaches the detectors positioned on the display 135 via the optics block 118.

Figure 3B:
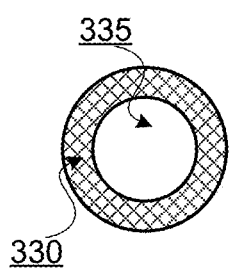
FIG. 3B depicts the example retinal eye tracking system of FIG. 3A with a specific illumination and imaging pattern, in accordance with an embodiment.
Figure 3C:
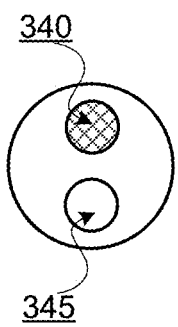
FIG. 3C depicts the example retinal eye tracking system of FIG. 3A with another specific illumination and imaging pattern, in accordance with an embodiment.

In some embodiments, the coating element 310 may be used to transmit the tracking light in a certain pattern such as one of the patterns depicted in either FIGS. 3B or 3C. For example, FIG. 3B depicts an annular pattern such that the tracking light is transmitted in an annular pattern similar to the outer ring pattern 330 depicted as a hashed region. In one embodiment, the annular pattern 330 is accomplished by applying a coating on the coating element 310 such that tracking light from the source 305 passes through the outer ring 330 and the light through the inner circular region 335 is substantially attenuated relative to the outer ring 330. In some embodiments, the beam splitter 315 is also coated with the same annular pattern shown in FIG. 3B such that the tracking light reflected from the cornea reaches the annular portion of the beam splitter 315 and reflects off to the source 305 instead of passing through the beam splitter 315 towards the optics block 118. For example, the beam splitter 315 may be coated with a reflective material such as silver for the annular portion (similar to region 330 shown in FIG. 3B) and is not coated (or coated with a transparent coating) for the central region (similar to region 335 shown in FIG. 3B). The tracking light reflected from the cornea (i.e., corneal backreflection) is reflected off by the reflective annular coating on the beam splitter 315 and reaches the source 305. In some embodiments, some portion of the corneal back reflections might scatter away from the beam splitter but do not pass through the optics block 118 and do not reach the display 135. The other portion of the light that is incident on the eye 145 reaches the retina and is reflected off of the retina and passes through the beam splitter 315 and reaches the display 135 via the optics block 118. This retinal reflection passes through the not coated (or transparent coated) portion of the beam splitter 315 and reaches the detectors on the display 135.

In an alternate embodiment, the coating element 310 is patterned such that the tracking light from source 305 is transmitted as a circular pattern as shown as region 340 of FIG. 3C. The region 340 depicts the tracking portion and region 345 depicts the imaging portion that represents the wanted reflections from the retinal surface. The tracking and imaging portions 340 and 345 are coated on the beam splitter 315 such that the corneal reflections of the eye 145 reach the source 305 and the retinal reflections reach the display 135. For example, the beam splitter is coated with a reflective coating corresponding to region 340 and a transparent coating corresponding to the region 345. An example technique for reducing backreflections in HMD systems that include "pupil-forming" optics system is described below with reference to FIG. 4.

Figure 4:
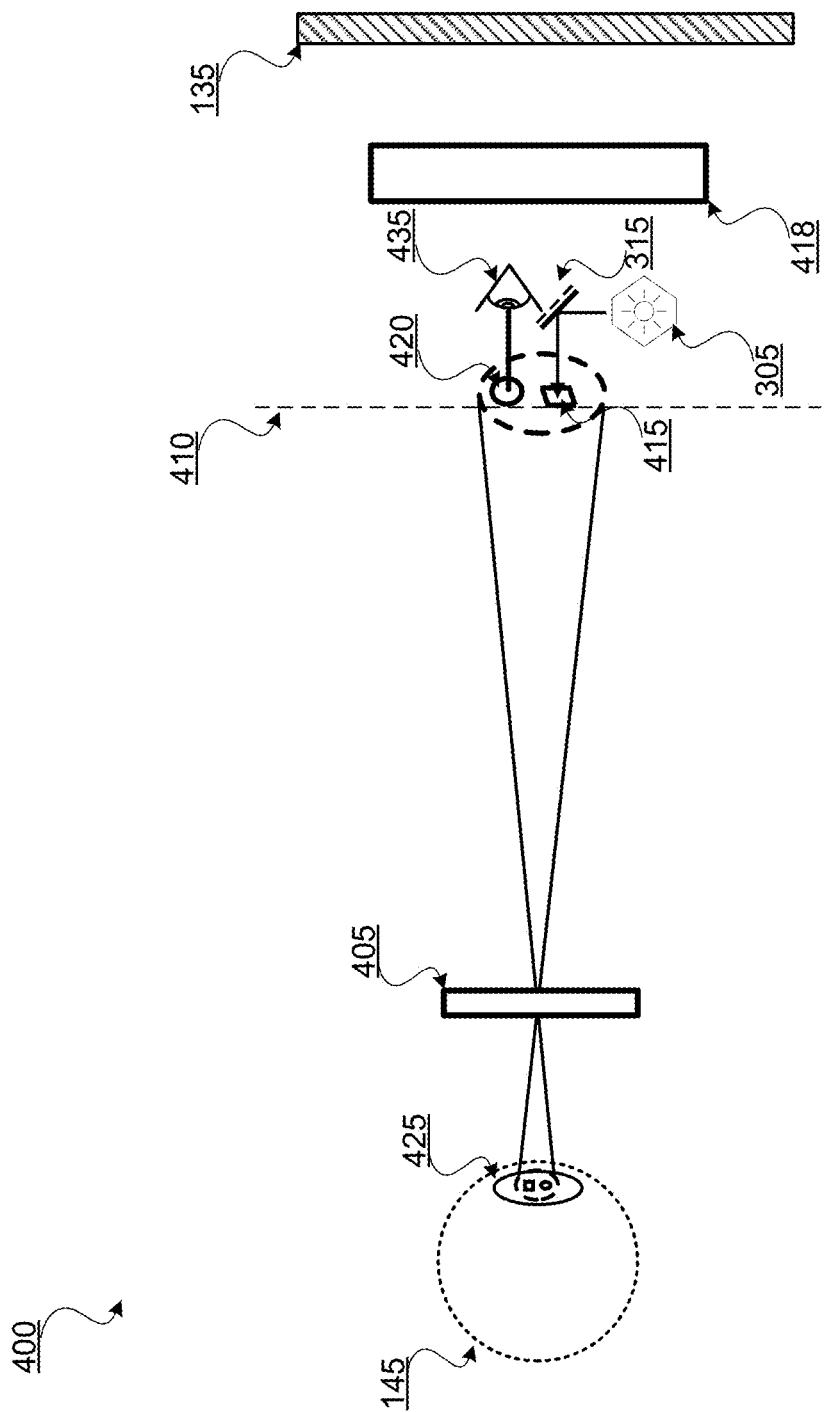
FIG. 4 depicts an example retinal eye tracking system for reducing backreflections in HMD systems using pupil-forming optical system, in accordance with an embodiment.

FIG. 4 depicts an example retinal eye tracking system 400 for reducing backreflection in HMD systems using pupil-forming optic system, in accordance with an embodiment. A pupil-forming HMD system is a system where there exists a plane that is a conjugate plane of the eye's pupil within the HMD system. In such HMD systems, an accessible image of the eye's pupil is created at the conjugate plane. The illumination portion and the imaging portion of the tracking light may be separated at the conjugate plane as discussed below.

The retinal eye tacking system 400 includes the electronic display element 135, the HMD lens 418, a pupil lens 405, the tracking light source 305, and the beam splitter 315. The HMD lens 418 and the pupil lens 405 are both part of the optics block 118 in the tracking system 400. The tracking light source 305 and the beam splitter 315 are placed between the eye 145 and the HMD lens 418. The tracking light source 305 emits tracking light that is reflected at the beam splitter 315 and reaches the cornea (and pupil) of the eye 145 via the pupil lens 405. The pupil lens 405 may be a lens similar to that of the HMD lens 418 except with a different focal length. The pupil lens 405 is used to create an accessible image of the pupil at a conjugate plane 410. As the pupil of the eye 145 is very close to its cornea, the corneal reflections may be captured at the pupil image at the conjugate plane 410. For example, the tracking light emitted by the source 305 may be passed through a specific shaped region (e.g., square region 415) at the conjugate plane 410 such that any reflections of the tracking light at the cornea traverse the same path to pass through the square region 415 and reach the source 305, instead of reaching the display 135. While some portion of the tracking light incident on the eye 145 is reflected at the cornea, other portions of the tracking light reach the retina and the retinal reflections may be captured using another region (e.g., circular region 420) at the conjugate plane 410. The eye 435 shown near the circular region 420 represents that the retinal image (i.e., imaging portion of the tracking light) may be captured either at the conjugate plane 410 itself or alternatively at the display 135 by letting the imaging tracking light pass through HMD lens 418. An example polarization technique for reducing backreflections is described below with reference to FIGS. 5A-5C FIGS. 5A-5C depict example polarization techniques for reducing backreflection in HMD systems, in accordance with an embodiment. Polarization techniques may be used to reduce backreflections by making use of the observation that polarized light that is reflected at the optics block 118 and at the cornea maintains the same polarization as its incident light, whereas light reflected by the retina is depolarized as light when passing through the cornea and then through the retina, the polarization of the light gets scrambled. In some embodiments, either one-dimensional or two-dimensional polarization techniques may be used.

As shown in FIG. 5A, the electronic display element 510 may be partitioned into two sets of regions, one including display and tracking pixels (e.g., regions 512), and the other for detector pixels (e.g., regions 514). The electronic display element 510 is the same as the electronic display element 135 described above with reference to FIG. 1 except that it is partitioned into regions 512 and 514. The first set of regions 512 including the display and tracking pixels is masked with a first polarization such as horizontal polarization and the second set of regions 514 that include the detector pixels may be masked with a second polarization that is orthogonal to the first polarization such as vertical polarization. The tracking light incident at the optics block 118 and the cornea is horizontally polarized and the backreflections at both the optics block 118 and at the cornea that reach the detector regions 514 are also horizontally polarized as such reflections maintain the polarization. Since the detector regions 514 are masked with a vertical polarization, the detectors do not capture any such backreflections. For the tracking light (and the display light emitted by the content pixels) that passes through the cornea and is reflected off of the retina, the polarization of the light gets scrambled and the tracking light is depolarized. The retinal reflections are captured by the detector regions 514 to the extent the depolarized retinal reflections have vertical polarized components. In an ideal scenario when the light is fully depolarized, the vertical component of the retinal reflections would be 50% when compared with the tracking light emitted at a tracking light source (e.g., the source 305). The tracking light source may be calibrated (e.g., increase the emitted light intensity by a factor of 2) to ensure that sufficient intensity of the retinal reflections are captured at the detectors.

Figure 6:
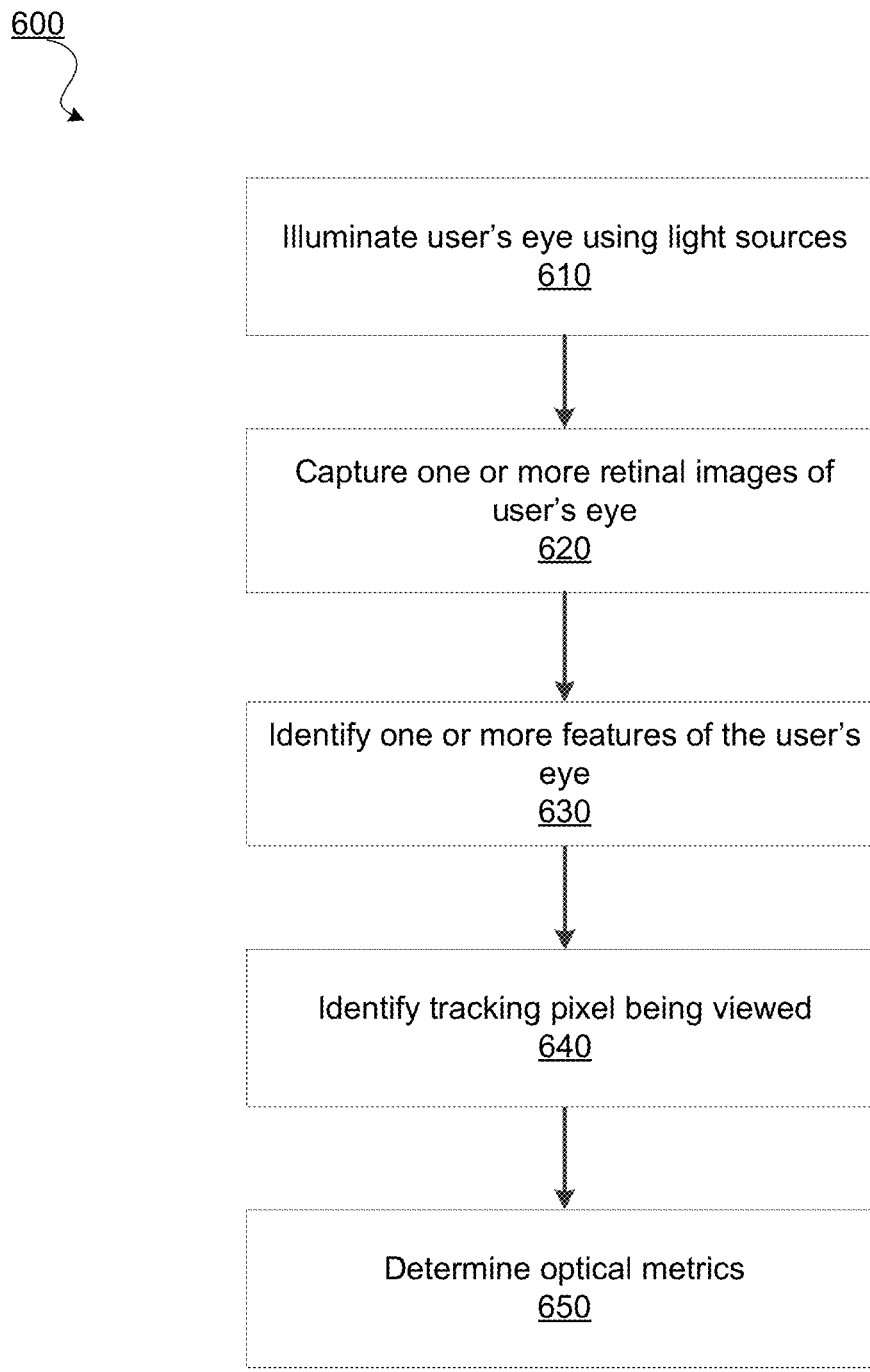
FIG. 6 is a flowchart of an example process for retinal eye tracking using in HMD systems, in accordance with an embodiment.

FIG. 5B depicts the electronic display element 520 that is partitioned into single region 522 that includes both the display and tracking pixel regions, and a single detector pixel region 524 as opposed to multiple each such regions shown in FIG. 6. The display 520 of FIG. 5B may be operated in the same method as discussed above with reference to FIG. 5A to reduce backreflections. FIG. 5C depicts the electronic display element 530 that is similar to display 520 except that the region 522 of FIG. 5B is partitioned further into a separate content pixel region 532 and a separate tracking pixel region 534. The electronic display element also includes a single detector pixel region 536. The polarization techniques to reduce backreflections would work as long as the polarization used for the detectors is orthogonal to that of the tracking light.

FIG. 6 is a flowchart of an example process 600 for retinal eye tracking using in HMD systems, in accordance with an embodiment. The example process 600 of FIG. 6 may be performed by the retinal eye tracking system 200, e.g., as part of a HMD (e.g., HMD 705) and/or a console (e.g., console 710), or some other system (e.g., an AR system). Other entities may perform some or all of the steps of the process in other embodiments Likewise, embodiments may include different and/or additional steps, or perform the steps in different orders. The example process of FIG. 6 is for tracking one of the user's eyes and can also be implemented (either concurrently or sequentially) for tracking the user's other eye.

The retinal eye tracking system 200 illuminates 610 the user's eye by turning on tracking pixels (e.g., illumination sources 242 and 244). The tracking pixels are positioned at known locations relative to locations of, e.g., a detector (e.g., detector 246). These tracking light sources emit light that is incident on the user's eye such that the retina of the eye reflects the light.

The retinal eye tracking system 200 captures 620 one or more retinal images of the user's eye while the eye is viewing the tracking light emitted from the tracking light sources. In one embodiment, the retinal eye tracking system 200 captures a single image of the retina. Alternatively, the retinal eye tracking system 200 captures multiple images of the retina while the user looks at one or more tracking pixels at known location (e.g., specific points on the electronic display element 135).

The retinal eye tracking system 200 identifies 630 one or more features of the eye in the captured retinal images while the user is viewing the tracking light from the specific tracking pixel. The one or more features of the eye include, for example, fovea, blood vessels, capillaries, the optic disk, nerve fiber bundles, and certain structures caused by pathology.

The retinal eye tracking system 200 identifies 640 a location of the tracking pixel being viewed by the user by analyzing the identified one or more features. The control module 250 of the tracking system 200 analyzes the identified features of the eye within the captured retinal images to determine the specific tracking pixel the eye is looking at while the retinal images are captured. The tracking pixel is determined, for example, by identifying a location of one or more features of the eye (e.g., fovea) within the captured images. In one embodiment, the tracking pixel the user is looking at is determined by identifying a location of the fovea relative to a reference point (e.g., center of the captured image) on the captured image.

Alternatively, the tracking pixel the user is looking at is determined by comparing the captured set of retinal image with a set of baseline retinal images, where the baseline set of images is captured during the retinal calibration process as described above with reference to FIG. 2. The tracking pixel the user is looking at while viewing content in the HMD may be determined by comparing the set of retinal images captured while with the viewing the content with the baseline set of images specific to the user by using algorithms such as cross correlation algorithms.

The retinal eye tracking system 200 determines 650 one or more optical metrics based on the identified tracking pixel that user is looking at. For example, the tracking system 200 determines the user's gaze direction based on the known location of the identified tracking pixel within the HMD system. Other optical metrics include, e.g., determining a user's vergence angle (or vergence depth), a user's accommodation depth, identification of the user, an eye's torsional state, or some combination thereof. Some of the example optical metrics might require captured retinal images of both the user's eyes to perform the optical metrics, and one or more steps of the example process 600 may additionally be performed for the user's other eye (either concurrently or sequentially) to determine such optical metrics.

FIG. 7 is a block diagram of a system 700 in which a HMD 705 including a retinal eye tracking system 760. The system 700 may be for use as a VR system, an AR system, a MR system, or some combination thereof. The system 700 shown by FIG. 7 comprises the HMD 705, an imaging device 735, and an input interface 740 that are each coupled to the console 710. While FIG. 7 shows an example system 700 including one HMD 705, one imaging device 735, and one input interface 740, in other embodiments any number of these components may be included in the system 700. For example, there may be multiple HMDs 705 each having an associated input interface 740 and being monitored by one or more imaging devices 735, with each HMD 705, input interface 740, and imaging devices 735 communicating with the console 710. In alternative configurations, different and/or additional components may be included in the system environment 700. Similarly, functionality of one or more of the components can be distributed among the components in a different manner than is described here. For example, some or all of the functionality of the console 710 may be contained within the HMD 705.

The HMD 705 presents content to a user. Examples of content presented by the HMD 705 include one or more images, video, audio, or some combination thereof. In some embodiments, audio is presented via an external device (e.g., speakers and/or headphones) that receives audio information from the HMD 705, the console 710, or both, and presents audio data based on the audio information. Some embodiments of the HMD 705 are further described above with reference to FIGS. 1A and 1B. The HMD 705 may act as a VR, AR, and/or a MR HMD. An MR and/or AR HMD augments views of a physical, real-world environment with computer-generated elements (e.g., images, video, sound, etc.).

The HMD 705 includes an electronic display 715, an optics block 718, one or more locators 720, one or more position sensors 725, an inertial measurement unit (IMU) 730, and a retinal eye tracking system 760. The electronic display 715 presents images to the user in accordance with data received from the console 710. In various embodiments, the electronic display 715 may comprise a single electronic display element or multiple electronic display elements (e.g., a display for each eye of a user). Examples of the electronic display element include: a liquid crystal display (LCD), an organic light emitting diode (OLED) display, an active-matrix organic light-emitting diode display (AMOLED), some other display, or some combination thereof.

The electronic display 715 includes a display area comprising a plurality of sub-pixels under each unit repeating pixel structure, where a sub-pixel is a discrete light emitting component, and a pixel structure includes a plurality of the same sub-pixels (e.g., red, blue, green). Different sub-pixels are separated from each other by dark space regions also known as "black matrix." A dark space region is the portion of the display area that does not emit light. For example, a sub-pixel emits red light, yellow light, blue light, green light, white light, or any other suitable color of light. In some embodiments, images projected by the electronic display 715 are rendered on the sub-pixel level. This is distinct from, say an RGB (red-green-blue) layout, which has discrete red, green, and blue pixels (red, green, and blue) and each pixel in the RGB layout includes a red sub-pixel, which is adjacent to a green sub-pixel that is adjacent to a blue sub-pixel; the red, green, and blue sub-pixels operate together to form different colors. In an RGB layout a sub-pixel in a pixel is restricted to working within that pixel. However, in some embodiments, sub-pixels in the electronic display operate within multiple "logical" pixels in their surrounding vicinity to form different colors. The sub-pixels are arranged on the display area of the electronic display 715 in a sub-pixel array. Examples of a sub-pixel array include PENTILE® RGBG, PENTILE® RGBW, some another suitable arrangement of sub-pixels that renders images at the sub-pixel level. In some embodiments, one or more adjacent sub-pixels are of the same color.

Each sub-pixel emits light according to an emission distribution. In some embodiments, the sub-pixels have relatively broad emission distribution (e.g., a Lambertian emission distribution or something similar). An emission distribution describes a range of angles of light emitted from a sub-pixel. The emission distribution can be quantified in terms of solid angle. A solid angle is a three-dimensional analog of an ordinary angle such as that subtended by a cone and is measured in steradians.

The optics block 718 magnifies received light from the electronic display 715, corrects optical errors associated with the image light, and presents the corrected image light is presented to a user of the HMD 705. An optical element may be an aperture, a Fresnel lens, a convex lens, a concave lens, a filter, or any other suitable optical element that affects the image light emitted from the electronic display 715. Moreover, the optics block 718 may include combinations of different optical elements. In some embodiments, one or more of the optical elements in the optics block 718 may have one or more coatings, such as partially reflective, polarization filters, and/or anti-reflective coatings. In some embodiments, the optics block 718 may a HMD lens (e.g., HMD lens 418) used for viewing content by a user of the HMD and also a pupil lens (e.g., 405) for creating an accessible image of the pupil at a conjugate plane as described above with reference to FIG. 4.

Magnification of the image light by the optics block 718 allows the electronic display 715 to be physically smaller, weigh less, and consume less power than larger displays. Additionally, magnification may increase a field of view of the displayed content. For example, the field of view of the displayed content is such that the displayed content is presented using almost all (e.g., 110 degrees diagonal), and in some cases all, of the user's field of view. In some embodiments, the optics block 718 is designed so its effective focal length is larger than the spacing to the electronic display 715, which magnifies the image light projected by the electronic display 715. Additionally, in some embodiments, the amount of magnification may be adjusted by adding or removing optical elements.

The optics block 718 may be designed to correct one or more types of optical errors. Examples of optical errors include: two-dimensional optical errors, three-dimensional optical errors, or some combination thereof. Two-dimensional errors are optical aberrations that occur in two dimensions. Example types of two-dimensional errors include: barrel distortion, pincushion distortion, longitudinal chromatic aberration, transverse chromatic aberration, or any other type of two-dimensional optical error. Three-dimensional errors are optical errors that occur in three dimensions. Example types of three-dimensional errors include spherical aberration, comatic aberration, field curvature, astigmatism, or any other type of three-dimensional optical error. In some embodiments, content provided to the electronic display 715 for display is pre-distorted, and the optics block 718 corrects the distortion when it receives image light from the electronic display 715 generated based on the content.

The locators 720 are objects located in specific positions on the HMD 705 relative to one another and relative to a specific reference point on the HMD 705. A locator 720 may be a light emitting diode (LED), a corner cube reflector, a reflective marker, a type of light source that contrasts with an environment in which the HMD 705 operates, or some combination thereof. In embodiments where the locators 720 are active (i.e., an LED or other type of light emitting device), the locators 720 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 720 are located beneath an outer surface of the HMD 705, which is transparent to the wavelengths of light emitted or reflected by the locators 720 or is thin enough to not substantially attenuate the wavelengths of light emitted or reflected by the locators 720. Additionally, in some embodiments, the outer surface or other portions of the HMD 705 are opaque in the visible band of wavelengths of light. Thus, the locators 720 may emit light in the IR band under an outer surface that is transparent in the IR band but opaque in the visible band.

The IMU 730 is an electronic device that generates fast calibration data based on measurement signals received from one or more of the position sensors 725. A position sensor 725 generates one or more measurement signals in response to motion of the HMD 705. Examples of position sensors 725 include: one or more accelerometers, one or more gyroscopes, one or more magnetometers, another suitable type of sensor that detects motion, a type of sensor used for error correction of the IMU 730, or some combination thereof. The position sensors 725 may be located external to the IMU 730, internal to the IMU 730, or some combination thereof.

Based on the one or more measurement signals from one or more position sensors 725, the IMU 730 generates fast calibration data indicating an estimated position of the HMD 705 relative to an initial position of the HMD 705. For example, the position sensors 725 include multiple accelerometers to measure translational motion (forward/back, up/down, left/right) and multiple gyroscopes to measure rotational motion (e.g., pitch, yaw, roll). In some embodiments, the IMU 730 rapidly samples the measurement signals and calculates the estimated position of the HMD 705 from the sampled data. For example, the IMU 130 integrates the measurement signals received from the accelerometers over time to estimate a velocity vector and integrates the velocity vector over time to determine an estimated position of a reference point on the HMD 705. Alternatively, the IMU 730 provides the sampled measurement signals to the console 710, which determines the fast calibration data. The reference point is a point that may be used to describe the position of the HMD 705. While the reference point may generally be defined as a point in space; however, in practice the reference point is defined as a point within the HMD 705 (e.g., a center of the IMU 730).

The IMU 730 receives one or more calibration parameters from the console 710. As further discussed below, the one or more calibration parameters are used to maintain tracking of the HMD 705. Based on a received calibration parameter, the IMU 730 may adjust one or more IMU parameters (e.g., sample rate). In some embodiments, certain calibration parameters cause the IMU 730 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The retinal eye tracking system 760 tracks a user's eye by capturing images of the user's retina. The tracking system 760 including a retina tracking unit and a control module.

The eye tracking unit is located within the HMD 705 and includes, among other components, tracking light sources and detectors. The tracking light sources (e.g., point light sources) and detectors (e.g., camera) of the eye tracking unit are used for illuminating the cornea and capturing images of the cornea while the user is viewing content on the HMD 705. The tracking light sources and the detectors are coupled to the control module that performs the necessary data processing for tracking the eye and for determining optical metrics. The control module is located within the HMD 705 and/or the console 710. The retinal eye tracking system 760 may be an embodiment of, e.g., retinal eye tracking system 200, retinal eye tracking system 300, and retinal eye tracking system 400, that are described above with reference to FIGS. 2, 3A-3C, and 4.

The imaging device 735 generates slow calibration data in accordance with calibration parameters received from the console 710. Slow calibration data includes one or more images showing observed positions of the locators 720 that are detectable by the imaging device 735. The imaging device 735 may include one or more cameras, one or more video cameras, any other device capable of capturing images including one or more of the locators 720, or some combination thereof. Additionally, the imaging device 735 may include one or more filters (e.g., used to increase signal to noise ratio). The imaging device 735 is configured to detect light emitted or reflected from locators 720 in a field of view of the imaging device 735. In embodiments where the locators 720 include passive elements (e.g., a retroreflector), the imaging device 735 may include a light source that illuminates some or all of the locators 720, which retro-reflect the light towards the light source in the imaging device 735. Slow calibration data is communicated from the imaging device 735 to the console 710, and the imaging device 735 receives one or more calibration parameters from the console 710 to adjust one or more imaging parameters (e.g., focal length, focus, frame rate, ISO, sensor temperature, shutter speed, aperture, etc.).

The input interface 740 is a device that allows a user to send action requests to the console 710. An action request is a request to perform a particular action. For example, an action request may be to start or end an application or to perform a particular action within the application. The input interface 740 may include one or more input devices. Example input devices include: a keyboard, a mouse, a game controller, or any other suitable device for receiving action requests and communicating the received action requests to the console 710. An action request received by the input interface 740 is communicated to the console 710, which performs an action corresponding to the action request. In some embodiments, the input interface 740 may provide haptic feedback to the user in accordance with instructions received from the console 710. For example, haptic feedback is provided when an action request is received, or the console 710 communicates instructions to the input interface 740 causing the input interface 740 to generate haptic feedback when the console 710 performs an action.

The console 710 provides content to the HMD 705 for presentation to the user in accordance with information received from one or more of: the imaging device 735, the HMD 705, and the input interface 740. In the example shown in FIG. 7, the console 710 includes an application store 745, a tracking module 750, and a VR engine 755. Some embodiments of the console 710 have different modules than those described in conjunction with FIG. 1. Similarly, the functions further described below may be distributed among components of the console 710 in a different manner than is described here.

The application store 745 stores one or more applications for execution by the console 710. An application is a group of instructions, that when executed by a processor, generates content for presentation to the user. Content generated by an application may be in response to inputs received from the user via movement of the HMD 705 or the interface device 740. Examples of applications include: gaming applications, conferencing applications, video playback application, or other suitable applications.

The tracking module 750 calibrates the system 700 using one or more calibration parameters and may adjust one or more calibration parameters to reduce error in determination of the position of the HMD 705. For example, the tracking module 750 adjusts the focus of the imaging device 735 to obtain a more accurate position for observed locators on the HMD 705. Moreover, calibration performed by the tracking module 750 also accounts for information received from the IMU 730. Additionally, if tracking of the HMD 705 is lost (e.g., the imaging device 735 loses line of sight of at least a threshold number of the locators 720), the tracking module 740 re-calibrates some or all of the system environment 700.

The tracking module 750 tracks movements of the HMD 705 using slow calibration information from the imaging device 735. The tracking module 150 also determines positions of a reference point of the HMD 705 using position information from the fast calibration information. Additionally, in some embodiments, the tracking module 750 may use portions of the fast calibration information, the slow calibration information, or some combination thereof, to predict a future location of the headset 705. The tracking module 750 provides the estimated or predicted future position of the HMD 705 to the VR engine 755.

The VR engine 755 executes applications within the system environment 700 and receives position information, acceleration information, velocity information, predicted future positions, or some combination thereof of the HMD 705 from the tracking module 750. Based on the received information, the VR engine 755 determines content to provide to the HMD 705 for presentation to the user. For example, if the received information indicates that the user has looked to the left, the VR engine 755 generates content for the HMD 705 that mirrors the user's movement in a virtual environment. Additionally, the VR engine 755 performs an action within an application executing on the console 710 in response to an action request received from the input interface 740 and provides feedback to the user that the action was performed. The provided feedback may be visual or audible feedback via the HMD 705 or haptic feedback via the input interface 740.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head-mounted display (HMD) comprising:
a display element including a plurality of pixels on a single substrate, and at least some of the plurality of pixels are content pixels configured to display content to a user wearing the HMD, at least a first portion of the plurality of pixels are tracking pixels, and at least a second portion of the plurality of pixels are detector pixels that are each positioned adjacent to at least one of the first portion of tracking pixels, the plurality of detector pixels configured to capture one or more images of a retina of an eye of the user, wherein the one or more images are of the retina reflecting light originating from one or more of the plurality of tracking pixels;
one or more illumination sources configured to emit light, wherein the one or more images of the retina include reflected light emitted by the one or more illumination sources;
an optics block configured to direct light from the display element to an exit pupil of the HMD, wherein the one or more illumination sources are positioned between the optics block and the exit pupil;
a beam splitter positioned between the exit pupil and the optics block, the beam splitter configured to reflect a portion of incident light towards the exit pupil such that corneal reflections from the eye are reflected by the beam splitter towards the one or more illumination sources; and
a controller configured to:
identify one or more features of the retina based on the captured one or more images of the retina, and
determine one or more optical metrics based in part on the identified one or more features of the retina.

2. The HMD of claim 1, wherein the one or more optical metrics comprise at least one of: gaze direction, vergence angle, accommodation depth, identification of the user, and torsional state.

3. The HMD of claim 1, wherein the controller is further configured to determine the one or more optical metrics based on identifying a location of the identified one or more features of the retina within the captured images.

4. The HMD of claim 3, wherein the identified one or more features of the retina comprise at least one of: fovea, blood vessels, capillaries, optic disk, and nerve fiber bundles.

5. The HMD of claim 1, wherein the one or more illumination sources are configured to emit light in an annular pattern caused by a coating in a shape of the annular pattern that is on a surface of the beam splitter.

6. The HMD of claim 1, wherein the one or more illumination sources are configured to emit light having a first polarization and at least one of the detector pixels is configured to capture light having a second polarization orthogonal to the first polarization.

7. The HMD of claim 1, wherein the one or more illumination sources comprise at least two illumination sources, the two illumination sources positioned in at least one of: a first two-dimensional plane with the two sources positioned at a same depth from a location of an entrance pupil of the HMD and in a second two-dimensional plane with the two sources positioned at different depths from the entrance pupil.

8. The HMD of claim 1, wherein a position of a detector pixel, of the plurality of detector pixels, corresponds to at least one of: an area between two adjacent content pixels and an overlay position relative to a position of a content pixel.

9. A method comprising:
displaying content to a user wearing a head-mounted display (HMD) via a display element of the HMD, the display element comprising a plurality of pixels on a single substrate, wherein at least some of the plurality of pixels are content pixels, at least a first portion of the plurality of pixels are tracking pixels, and at least a second portion of the plurality of pixels are detector pixels that are each positioned adjacent to at least one of the first portion of tracking pixels, the plurality of detector pixels configured to capture one or more images of a retina of an eye of the user, wherein the one or more images are of the retina reflecting light originating from one or more of the plurality of tracking pixels;
emitting light by one or more illumination sources, wherein the one or more images of the retina include reflected light emitted by the one or more illumination sources;
directing, by an optics block, light from the display element to an exit pupil of the HMD, wherein the one or more illumination sources are positioned between the optics block and the exit pupil;
reflecting, by a beam splitter, a portion of incident light towards the exit pupil such that corneal reflections from the eye are reflected by the beam splitter towards the one or more illumination sources;
identifying, by a controller, one or more features of the retina based on the captured one or more images of the retina; and
determining, by the controller, one or more optical metrics based in part on the identified one or more features of the retina.

10. The method of claim 9, wherein the one or more optical metrics comprise at least one of: gaze direction, vergence angle, accommodation depth, identification of the user, and torsional state.

11. The method of claim 9, further comprising:
determining, by the controller, the one or more optical metrics based on identifying a location of the identified one or more features of the retina within the captured images.

12. The method of claim 11, wherein the identified one or more features of the retina comprise at least one of: fovea, blood vessels, capillaries, optic disk, and nerve fiber bundles.

13. The method of claim 9, wherein the one or more illumination sources comprise at least two illumination sources, the two illumination sources positioned in at least one of: a first two-dimensional plane with the two sources positioned at a same depth from a location of an entrance pupil of the HMD and in a second two-dimensional plane with the two sources positioned at different depths from the entrance pupil.

14. The method of claim 9, wherein the position of a detector pixel of the plurality of detector pixels corresponds to at least one of: an area between two adjacent content pixels and an overlay position relative to a position of a content pixel.

* * * * *